United States Patent
Marsac et al.

(10) Patent No.: US 8,718,435 B2
(45) Date of Patent: May 6, 2014

(54) TERMINAL ENCLOSURE WITH EXTRACTABLE FIBER ORGANIZER TRAY

(75) Inventors: Yvonnick Marsac, Drefféac (FR); Michel T. Menguy, Le Relecq-Kerhuon (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/577,821

(22) PCT Filed: Feb. 16, 2011

(86) PCT No.: PCT/US2011/025045
§ 371 (c)(1),
(2), (4) Date: Aug. 8, 2012

(87) PCT Pub. No.: WO2011/112329
PCT Pub. Date: Sep. 15, 2011

(65) Prior Publication Data
US 2013/0094826 A1   Apr. 18, 2013

(30) Foreign Application Priority Data

Mar. 10, 2010   (EP) .................................. 10156041

(51) Int. Cl.
*G02B 6/46* (2006.01)
(52) U.S. Cl.
USPC ............................................... 385/135
(58) Field of Classification Search
USPC ...................................................... 385/135
See application file for complete search history.

(56) References Cited

U.S. PATENT DOCUMENTS

| | | | |
|---|---|---|---|
| 4,441,785 A | 4/1984 | Petrozello | |
| 4,502,754 A | 3/1985 | Kawa | |
| 4,702,551 A | 10/1987 | Coulombe | |
| 4,840,449 A * | 6/1989 | Ghandeharizadeh | ......... 385/135 |
| 4,863,233 A | 9/1989 | Nienaber | |
| 4,886,336 A * | 12/1989 | Deusser et al. | ............... 385/135 |
| 4,976,510 A | 12/1990 | Davila | |
| 5,206,927 A * | 4/1993 | Finzel et al. | .................. 385/135 |
| 5,323,480 A | 6/1994 | Mullaney | |
| 5,835,657 A | 11/1998 | Suarez | |
| 6,188,826 B1 | 2/2001 | Daoud | |
| 6,249,635 B1 | 6/2001 | Daoud | |
| 6,275,639 B1 | 8/2001 | Bolt | |
| 6,282,360 B1 | 8/2001 | Milanowski | |
| 6,315,598 B1 | 11/2001 | Elliot | |
| 6,379,166 B1 | 4/2002 | Hagarty | |
| 6,435,727 B1 | 8/2002 | Fingler | |
| 6,496,638 B1 | 12/2002 | Andersen | |

(Continued)

FOREIGN PATENT DOCUMENTS

DE      101 13 528 A1      9/2002
EP      0 626 603 A1      11/1994

(Continued)

*Primary Examiner* — Michelle R Connelly
(74) *Attorney, Agent, or Firm* — Janet A. Kling

(57) ABSTRACT

A terminal enclosure (1) for optical fibers for communication comprising a housing, including a base (2) and a cover, and an extractable fiber organizer tray (11), that is disposable in the housing having a first and a second side. The extractable fiber organizer tray comprises a splicing portion (12), a fiber connector mounting portion (28) and portions for storing an entering jacketed cable (14) as well as the fibers (13) of the stripped portion of the cable (6).

20 Claims, 7 Drawing Sheets

(56) References Cited

U.S. PATENT DOCUMENTS

| | | |
|---|---|---|
| 6,543,940 B2 | 4/2003 | Chu |
| 6,810,193 B1 | 10/2004 | Müller |
| 7,274,852 B1 | 9/2007 | Smrha |
| 7,406,241 B1 | 7/2008 | Opaluch |
| 2003/0002810 A1 | 1/2003 | Cheng |
| 2004/0013389 A1 | 1/2004 | Taylor |
| 2005/0276562 A1* | 12/2005 | Battey et al. ........ 385/135 |
| 2006/0153362 A1 | 7/2006 | Bloodworth |
| 2007/0104447 A1 | 5/2007 | Allen |
| 2007/0274662 A1 | 11/2007 | Bayazit |
| 2011/0013875 A1* | 1/2011 | Bran de Leon et al. ... 385/135 |
| 2011/0030190 A1 | 2/2011 | Larson |

FOREIGN PATENT DOCUMENTS

| | | |
|---|---|---|
| EP | 2 045 636 A1 | 4/2009 |
| EP | 2 068 186 A1 | 5/2009 |
| JP | 63-141008 | 6/1988 |
| JP | 2005-164994 | 6/2005 |
| JP | 2005-189438 A | 7/2005 |
| KR | 20-0399079 Y1 | 10/2005 |
| KR | 20-0417161 Y1 | 5/2006 |
| KR | 10-2006-0078009 | 7/2006 |
| KR | 10-0645503 | 11/2006 |
| TW | 256407 | 9/1995 |
| TW | 371486 | 10/1999 |
| TW | M246334 | 10/2004 |
| TW | M252939 | 12/2004 |
| TW | M253779 | 12/2004 |
| TW | M271166 | 7/2005 |
| TW | I275258 | 3/2007 |
| TW | M308413 | 3/2007 |
| WO | WO 97/44872 | 11/1997 |
| WO | WO 2008/124293 | 10/2008 |

* cited by examiner

TERMINAL ENCLOSURE WITH EXTRACTABLE FIBER ORGANIZER TRAY

CROSS REFERENCE TO RELATED APPLICATIONS

This application is a national stage filing under 35 U.S.C. 371 of PCT/US2011/025045, filed Feb. 16, 2011, which claims priority to European Application No. 10156041.5, filed Mar. 10, 2010, the disclosure of which is incorporated by reference in its/their entirety herein.

The invention relates to a terminal enclosure for optical fibers for communications with a housing, including a base and a cover, and an extractable fiber organizer tray.

BACKGROUND

Telecommunication cables are used for distributing all manner of data across vast networks. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, premises, and so on.

Conventionally, a service provider installs an enclosure at a main access point in a building (often called a fiber distribution hub (FDH)) which couples service fibers to a riser cable that delivers the fibers to a terminal (known as a fiber distribution terminal (FDT)) installed on each floor, or every few floors. The FDT connects the building riser cable to horizontal drop cables which run to each living unit on a floor. The drop cable ends in a terminal enclosure which usually is installed in an end users apartment. In such a terminal enclosure the fibers of the drop cable are terminated such that the end user may connect them to the apparatus that he wants to use to receive and/or send any data. Therefore the drop cable fibers that enter the terminal enclosure are either spliced to optical fiber pigtails or terminated with field mountable connectors.

EP 2 045 636 A1 describes a terminal closure for optical fibers for communications with a housing, including a base having an opening for receiving a connector as well as fiber guides for a secure storage of fibers.

WO 2008/124 293 A1 discloses a communication socket comprising a housing with a base having a bottom wall and a plurality of side walls and cover portion. The base portion and the cover portion are detachably engaged with each other. The base portion includes a plurality of knock-off holes for inserting an optical fiber at different positions in the sidewall and/or a plurality of fiber entries in the bottom wall. The fiber connector mounting portion extends from the base.

There are new regulations that force providers to install in some areas—especially in areas with high population—a certain number of fibers per subscriber. The reason for such a regulation is that one fiber may be used for each provider instead of sharing one fiber.

Because of these regulations there is a need for a terminal enclosure, that may be installed at an end user, and that provides the possibility to install more than one fiber per subscriber. Such an enclosure would need to have a splicing area where the fiber ends would be spliced to optical fiber pigtails or where a preconnectorized cable could be installed. Such an enclosure would further need to have a portion where connectors may be mounted. And such an enclosure would also need to have areas for storing cables and/or fibers. Additionally such a terminal box or enclosure should be easy to manufacture and therewith cheap to manufacture as well as easy to handle, that means easy to install.

SUMMARY OF THE INVENTION

The present invention provides a terminal enclosure for optical fibers for communications with a housing including a base, a cover and an extractable fiber organizer tray. The extractable fiber organizer tray is disposable in the housing and has a first side and an opposite second side. The extractable fiber organizer tray comprises a splicing portion, a fiber connector mounting portion and portions for storing an entering jacketed cable as well as the fibers of the stripped portion of the cable. In other words the present invention provides a terminal enclosure for optical fibers for communications with an extractable tray on which all management functions are concentrated. The terminal enclosure according to the invention may be installed in an apartment of an end user and may be used to terminate fibers for communications of a drop cable at connectors arranged inside the box. Therefore, the drop cable fibers entering the enclosure according to the invention may be spliced to optical fiber pigtails that lead to the connectors.

The enclosure according to the invention provides a very smart solution for a termination of fibers at an end users apartment. The enclosure may be assembled out of a low number of parts—only base, cover and tray are necessary—and is therefore easy and cheap to manufacture. Furthermore all functions, especially the cable or fiber management functions are located on one tray and that tray is extractable. That has the advantage that installation of the box is very simple. It is possible to extract the tray from the housing, put it on the table and do all the actions that are necessary to terminate the drop cable fibers. In particular, the extractable fiber organizer tray comprises a splicing portion, where splices may be arranged and fixed. Such splices may be necessary between the fibers entering the box and optical fiber pigtails that lead to connectors that are also arranged on the tray in the fiber connector mounting portion. Furthermore the extractable fiber organizer tray comprises a portion for storing an entering jacketed cable as well as a portion for storing fibers out of the jacketed cable, e.g. a stripped portion of the cable. Because of the low number of parts it is possible to minimize the volume of the enclosure. Additionally the management of the fiber and cable in the enclosure is very effective since all management functions are located on one extractable tray.

The housing and the tray may be made out of plastics, such as for example Polycarbonate and/or Acrylonitrile Butadiene Styrene. Advantageously they may be manufactured in a moulding process.

The terminal enclosure according to the invention may also be used to splice fibers from two jacketed drop cables entering the enclosure. In such a case the connector mounting portion is not used. It is only used the splicing portion and the splicing portions of the tray.

According to one embodiment of the invention the splicing portion and the storing portions for cable and fibers are arranged on the first side of the extractable fiber organizer tray while the connector mounting portion is arranged on the second side of the extractable fiber organizer tray. This arrangement permits to have access to the connectors but to keep the fiber splicing portion and fiber storing portion protected under the tray.

According to another embodiment of the invention the extractable fiber organizer tray may comprise an opening formed in the tray that permits passage of fibers from one side of the organizer tray to the other side. To use an opening in the tray to lead fibers from one side of the tray to the other side is a safe way of a passage of fibers since the fibers are surrounded by the tray. If the tray is put back into its housing the tray makes sure that the fibers will not be destroyed, e.g. by touching the housing. Furthermore an opening in the tray for a passage of the fiber is a space-saving way of providing a passage. This provides the possibility of designing the terminal enclosure according to the invention with small dimensions, which is nice since it may be used in an end users apartment. The opening may comprise a slot for inserting fibers into the opening. The opening may therefore be placed next to the edge of the tray.

The extractable fiber organizer tray may provide a cable guide that routs the jacketed cable entering the terminal enclosure. Furthermore the cable guides may also be used for guiding fibers. The cable guide may be a two level guide that routs fibers—for example 900 µm buffered fibers—on a lower level and a jacketed cable entering the terminal enclosure on an upper level. This cable guide may be arranged in the cable storing portion. The cable guide may provide means for securing the fibers and cable on the tray as well as means for protecting the fibers and cable against potential damage. The cable guide may be positioned along the outer edge of the first side of the extractable fiber organizer tray. 900 µm buffered fibers of a fiber pigtail or a preterminated drop cable may be coiled in the cable guide. The over length of the entering cable may be coiled in the cable guide around the tray. The cable guide is designed such that each cable bend does not violate a minimum bend radius of the optical fiber held within the jacketed cable. Furthermore, the cable guide may be used independent from the direction and/or corner the drop cable is entering the box.

According to another embodiment of the invention the extractable fiber organizer tray provides several fiber guides for guiding the fibers at the stripped portion of the cable. These fiber guides may be arranged in the fiber storing portion. The fiber guides may provide means for securing the fibers on the tray as well as means for protecting fibers against potential damage. The fiber guides may be fiber spools for slack storage or redirection of fiber pigtails and the stripped portion of the cable. Additional fiber routing structures may also be included on the tray to help contain and direct the fiber pigtails and the drop cable fibers. The fiber guides are designed such that the minimum bend radius for fibers is satisfied.

The fiber guides may be positioned inside of the cable guides. By this arrangement the space on the tray is used in a very efficient way. A bend radius of a jacketed cable is bigger than that of fibers and therefore the cable guide needs more space than the fiber guides.

The extractable fiber organizer tray may further comprise a set of mounting arms for securing splices formed between optical fiber pigtails and the fibers. These mounting arms may be arranged in the splice portion of the extractable fibre organizer tray. The mounting arms may be arranged such that they are capable of securing different kind of mechanical splices, such as for example 4×4 FIBRLOK™ splices (commercially available from 3M Company, St. Paul Minn.). Alternatively, holders can be configured to hold one or more fusion splices. The splicing portion of the extractable fiber organizer tray may be formed as an integral portion of the tray or it can be removable.

The mounting arms for splices may—as the fiber guides—be arranged inside of the cable guide. By this arrangement the space on the tray is used in a very efficient way and the terminal enclosure may be designed with a minimized volume.

According to another embodiment of the invention, the base of the terminal enclosure according to the invention may comprise mounting means for mounting the enclosure on a rail, for example a standard DIN rail. The mounting means may be any kind of means with which the terminal enclosure may be fixed on a rail, such as for example mounting arms, protrusions etc. The mounting means may have a snap fit structure so that the terminal enclosure may be snap fitted on a rail. The distance between the mounting means is such that the terminal enclosure may be fixed on standard rails. The mounting means may be positioned in such a way on the base that the terminal enclosure may be mounted in different directions on the rails. It is also possible that the base of the terminal enclosure comprises other means or elements for fixing the terminal enclosure such as for example openings for securing the terminal enclosure with screws on a wall or on a built-in box.

The base may further comprise fixing means for fixing the extractable fiber organizer tray inside the enclosure. Fixing of the tray inside the enclosure may have the advantage that the cable as well as the fibers may be stored in a safe way inside the terminal enclosure. The means for fixing the extractable fiber organizer tray may also be arranged on the cover of the enclosure. In such an arrangement the tray would be fixed in the cover and afterwards the cover would be fixed on the base to close the housing. The fixing means may be designed as snap fit elements so that the tray may be snap fitted into the housing. The tray is not hinged in the housing with the advantage that it may be removed out of the housing and that the person, who is installing the enclosure, has total accessibility to the fibers and splices. It is of course possible to hinge the tray such into the housing that the tray may be detached from the hinge.

The base may comprise several breakout portions for the cable entering the enclosure. Having several breakout portions for providing openings for an entering cable has the advantage that the enclosure may easily be adapted to each application so that an entering cable does not need to be bend in an unwanted way because the fibers or the cable can enter the enclosure in all directions while the fiber's bend radius is satisfied. Those breakout portions for the cable entering the enclosure may be completed by elastomer joints to ensure that no dust will enter the enclosure.

The cover of the terminal enclosure according to the invention may comprise at least two parts. A first part may be fixed to the base after mounting or installing the base and the extractable, organizer tray and a second detachable or removable part may be detachably mounted to the enclosure for providing access to the enclosure, for example to the connector mounting portion. The second part may be detachable from the first part. The detachable part of the cover may be arranged near or above the connector mounting portion of the extractable fiber organizer tray. With such an embodiment of the cover access as well as protection to the connector mounting portion is provided. It is also possible that the detachable part may provide access to other parts of the terminal enclosure and it is also possible that the cover provides more than one detachable part.

The cover may comprise several breakout portions for cables, e.g. patch cords, leaving the enclosure. Having several breakout portions for providing openings for leaving cables has the advantage that the enclosure may be very easy to adapt to each application. Furthermore the enclosure may provide a breakout portion for each cable that is connected to one of the fibers of the drop cable entering the enclosure.

Thus, the terminal enclosure described herein is easy and cheap to manufacture because it may comprise a small number of parts. Furthermore it is easy to install since all cable and fiber management functions are integrated on one tray and the tray is detachable from the enclosure. The volume of the enclosure can be minimized and the cable may enter the enclosure in all directions while the bend radius is satisfied. The management of the fiber and cable in the enclosure is effective.

BRIEF DESCRIPTION OF THE DRAWINGS

The invention will now be described in more detail with reference to the following Figures exemplifying particular embodiments of the invention.

DETAILED DESCRIPTION

Figure 1A:
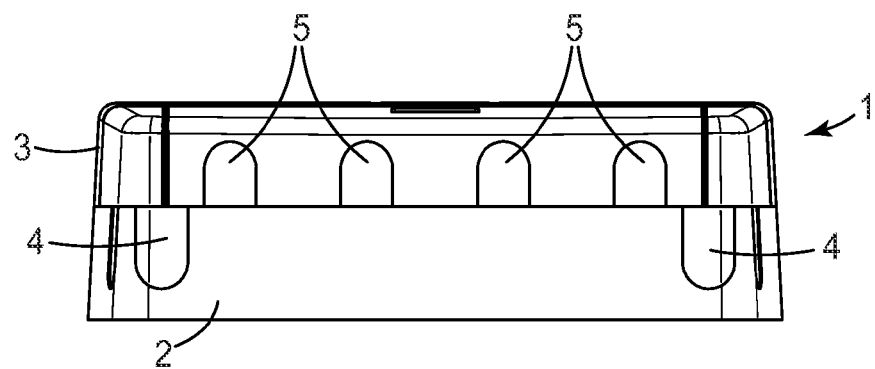
FIG. 1A is a side view of the housing of an enclosure according to one embodiment of the invention.

Herein below various embodiments of the present invention are described and shown in the drawings wherein like elements are provided with the same reference numbers.

Figure 1B:
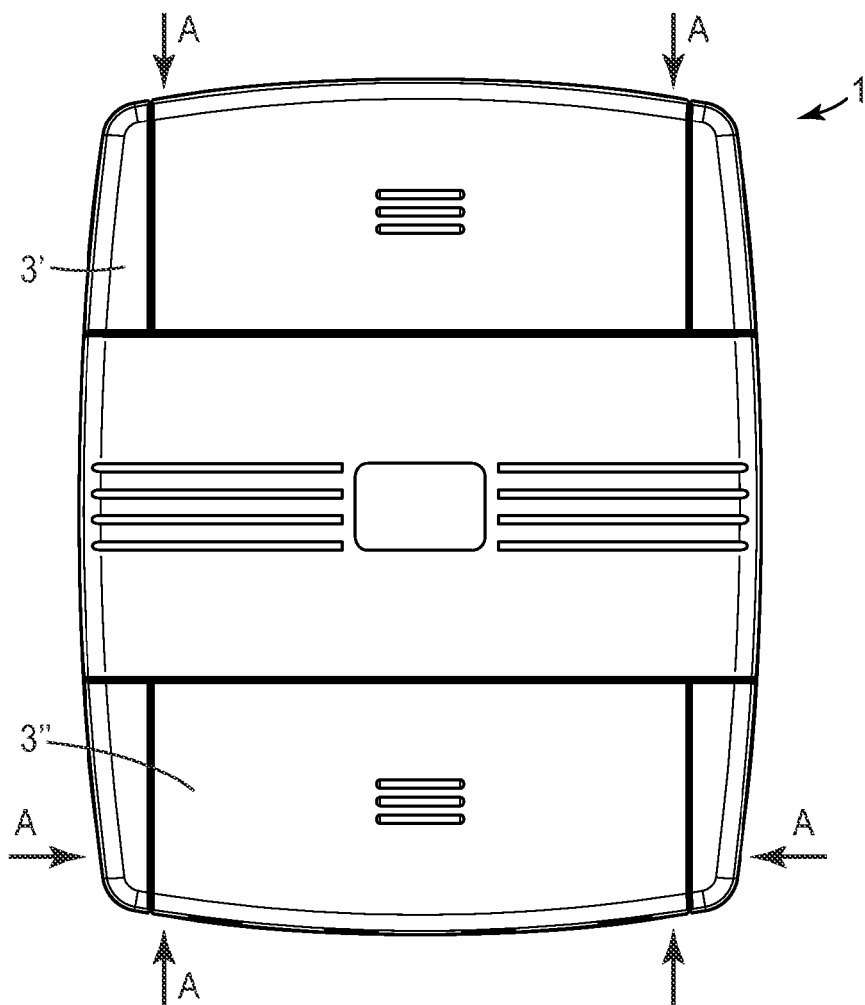
FIG. 1B is a side view from the other side of the housing of the enclosure of FIG. 1A.
Figure 1C:
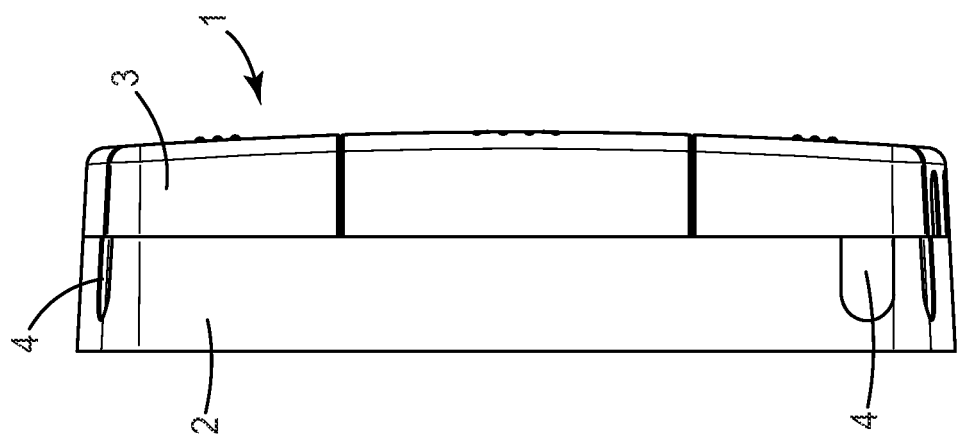
FIG. 1C is a top view of the housing of the enclosure of FIG. 1A and 1B.

In FIG. 1A is a side view of the housing of a terminal enclosure 1 according to one embodiment of the invention with a base 2 and a cover 3. Base 2 and cover 3 have a substantially rectangular shape. They each have a bottom wall and four side walls and may be engaged with each other. The base 2 has two breakout portions 4 for providing a passage to an entering cable 6. The breakout portions 4 are positioned in the side walls of the base 2. The cover 3 has four breakout portions 5 for providing a passage to a leaving cable 33, a patch cord. The breakout portions 5 are positioned in the side walls of the cover 3. FIG. 1C shows the terminal enclosure 1 from FIG. 1A from another side. Base 2 and cover 3 can be seen. In this view one breakout portion 4 from base 2 can be seen. FIG. 1B is a top view of the housing of the enclosure 1 of FIG. 1A. Only the cover 3 can be seen. The cover 3 includes two parts 3' and 3" as will be described with reference to FIG. 7. The little arrows A in FIG. 1B show where the base 2 provides breakout portions 4 and thus where a cable may enter the terminal enclosure 1. As can be seen, breakout portions 4 are provided on each corner of the terminal enclosure 1 and the breakout portions 4 are positioned such that a cable may enter the enclosure 1 from above, from right or left and from beneath to satisfy the bend radius of the fibers.

Figure 2:
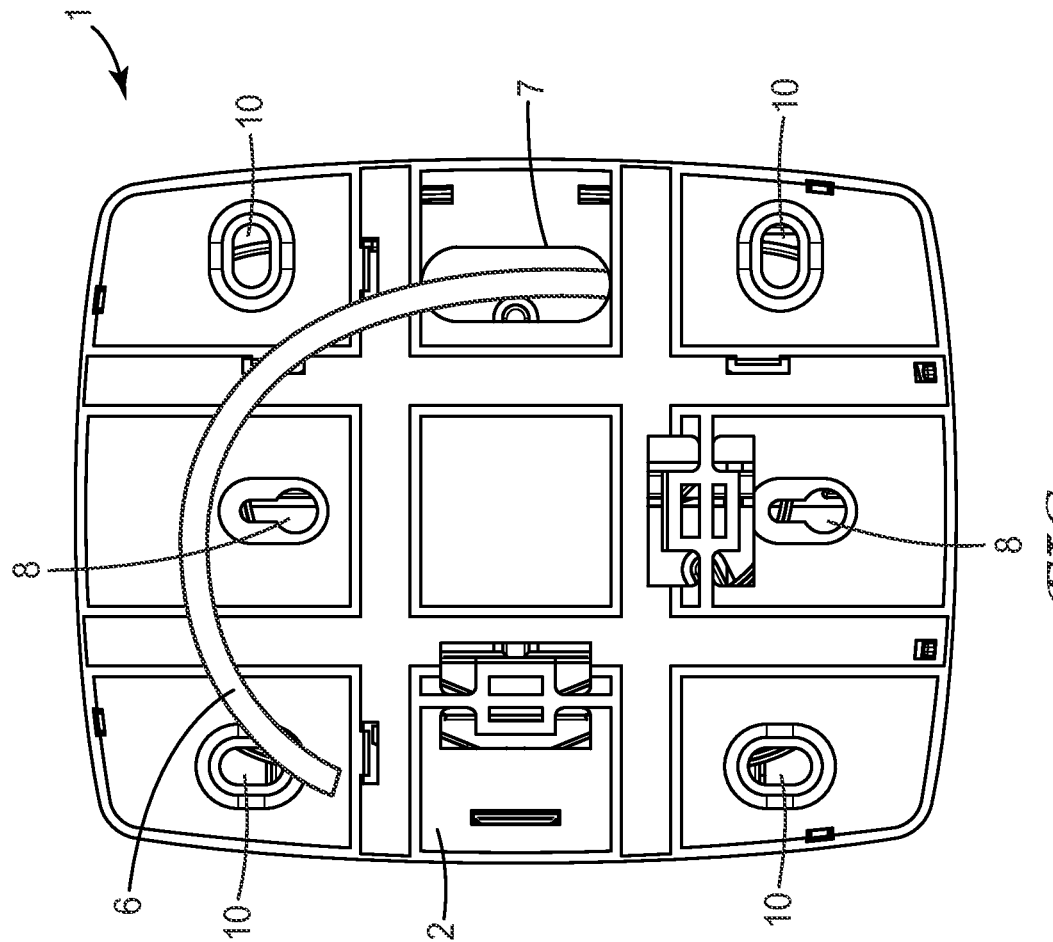
FIG. 2 is a bottom view of the housing of the enclosure of FIG. 1A to 1C with a cable entering the housing.
Figure 3:
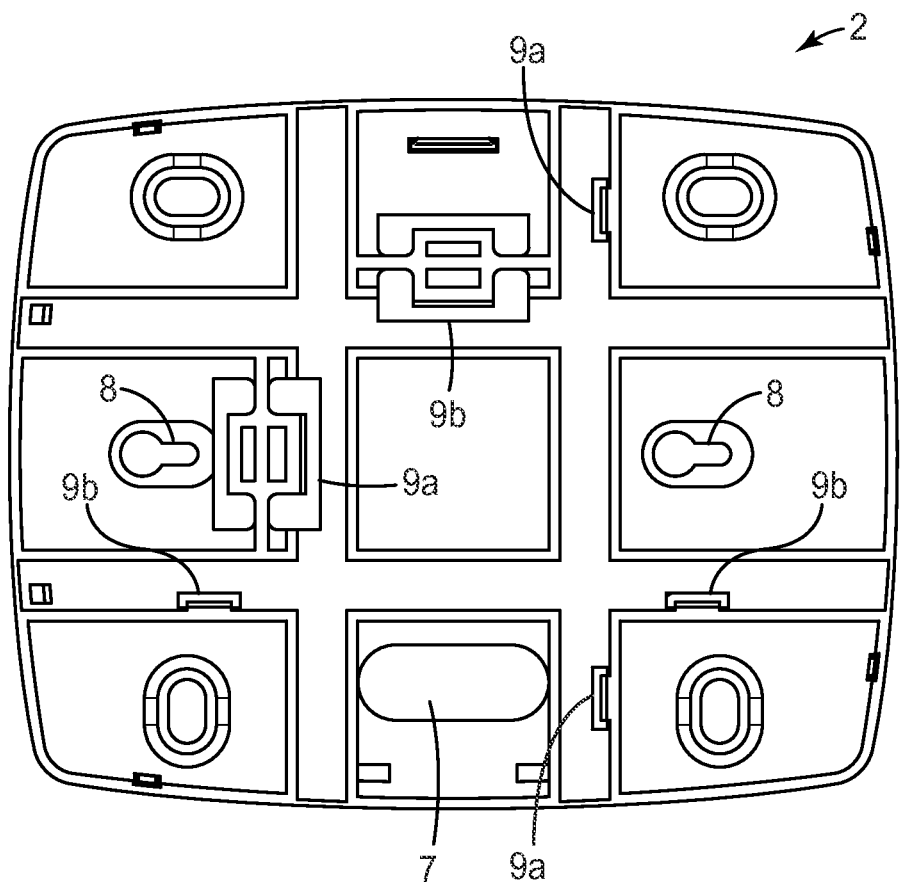
FIG. 3 is a bottom view of the base of the housing of the enclosure of FIG. 1A to 1C.

FIG. 2 is a bottom view of the terminal enclosure 1 according to the invention. A drop cable 6 enters the box (via base 2) through an opening 7 that can better be seen in FIG. 3. The base 2 has a substantially rectangular shape. It provides mounting means in the shape of protrusions 9 indicated either with 9a or 9b for mounting the terminal enclosure 1 on a standard rail, e.g. a standard DIN rail. The three protrusions 9a belong together and may be used to mount the terminal enclosure 1 on a vertical rail. One protrusion 9a will hold the rail from the left side and two protrusions 9a will hold the rail from the right side. Alternatively, the three protrusions 9b belong together and may be used to mount the terminal enclosure 1 on a horizontal rail. One protrusion will hold the rail from above and two protrusions 9a will hold the rail from underneath. The base provides further means for mounting or fixing the terminal enclosure, such as openings 10 for screws, e.g. when the enclosure is directly fixed on a wall. The base 2 provides further means for mounting or fixing the terminal enclosure, such as openings 8 for screws, e.g. when the enclosure is directly fixed on a built-in box. The openings 8 have a shape of a keyhole, in which the basically round part may be used for inserting the head of a screw and the more narrow, elongated part may be used for receiving the stem of the screw after inserting the head through the round part. As shown in FIG. 3 the additional opening 7 may provide access for an entering cable 6.

Figure 4A:
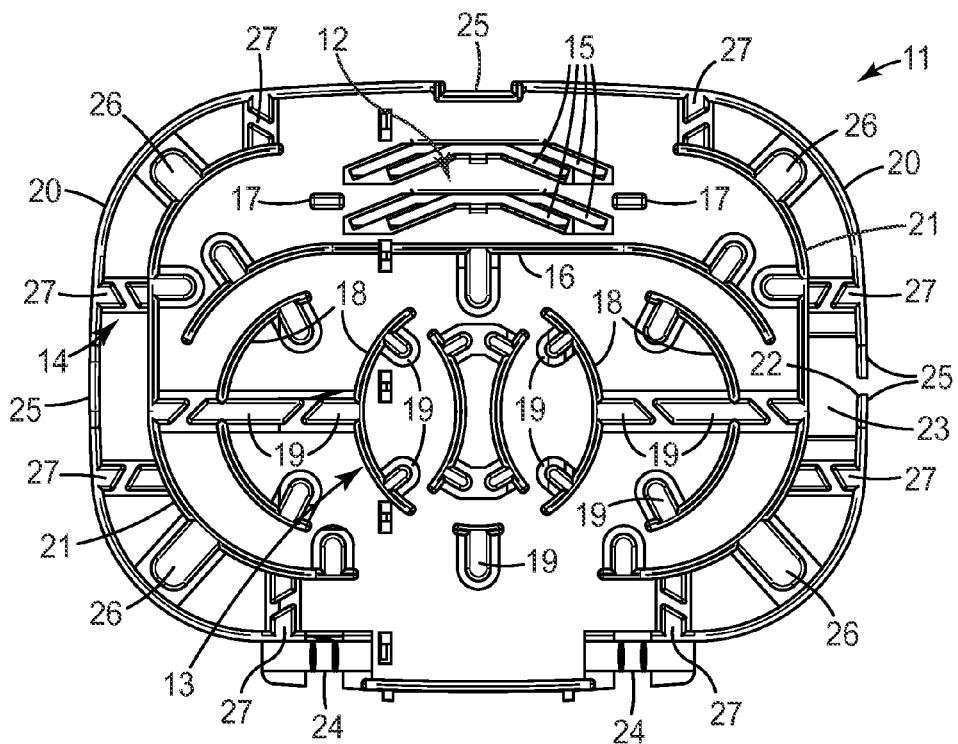
FIG. 4A is a top view of a first side of an extractable fiber organizer tray of the enclosure according to one embodiment of the invention.
Figure 4B:
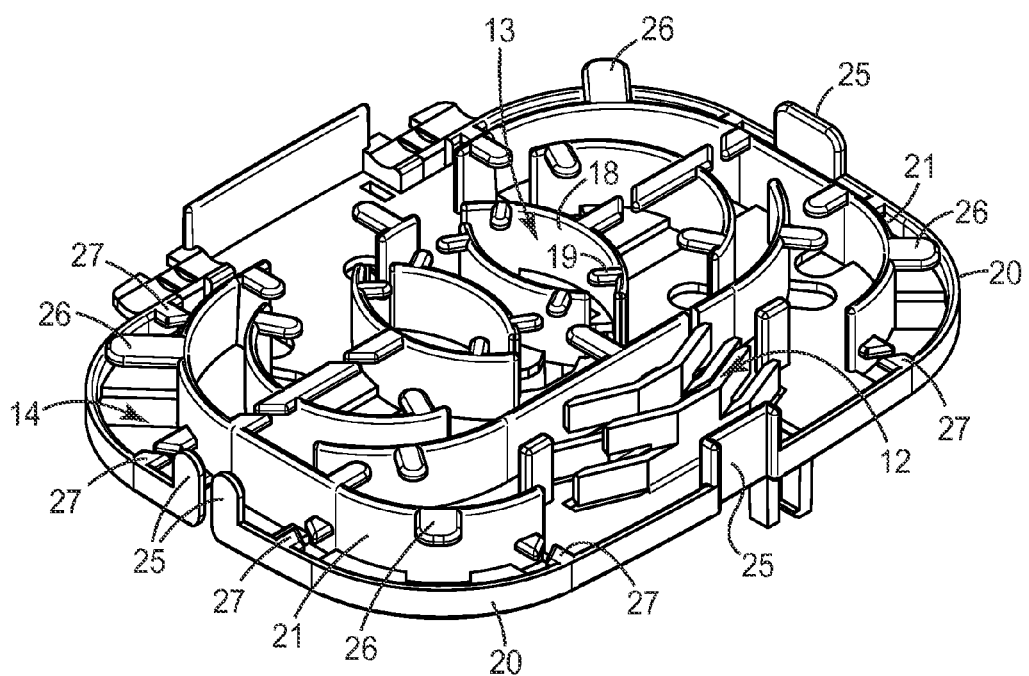
FIG. 4B is a three dimensional view of a first side of the extractable fiber organizer tray of FIG. 4A.

FIG. 4A is a top view of a first side of an extractable fiber organizer tray 11 of the enclosure 1 according to one embodiment of the invention. FIG. 4B is a three dimensional view of the same extractable fiber organizer tray 11. The first side of the extractable fiber organizer tray 11 comprises a splicing portion 12, a portion 13 for storing fibers and a two level portion 14 for storing fibers (900 μm buffered fibers) (in the lower level) and a jacketed cable (in the upper level). In the splicing portion 12 the tray 11 provides several flexible arms 15 for holding mechanical or fusion splices (not shown). The flexible arms 15 are positioned with an angle relative to a wall 16 or stops 17. When a splice is introduced in the space between the flexible arms 15 and the wall 16 or respectively stops 17 the arms 15 push the splices against the wall 16 and stops 17 and hold them there.

Fiber guides 18 are arranged in the portion for storing fibers 13 such that fibers of a stripped portion of a cable entering the enclosure 1 that lead to the splices may be coiled. Furthermore fibers that lead from the splices to connectors on the other side of the tray may be coiled in the storing portion 13 of the extractable fiber organizer tray 11 as well. The fiber guides 18 are little walls extending from the tray. They have a round shape with a radius that assures that the minimum bend radius of the fibers is satisfied. The guides 18 provide anchoring means 19 that prevent fibers that are coiled in the portion for storing fibers 13 from moving away from the tray 11. The anchoring means 19 are protrusions that are positioned on the top of the little walls and extend substantially parallel to the tray 11 itself. By this arrangement the fibers are held between the tray 11, the fiber guides 18 and the anchoring means 19.

The tray 11 comprises cable guides 20, 21 in the portion 14 for storing fibers as well as a jacketed cable 14. Fibers and cable are stored in two levels as will be described later. The cable guides 20, 21 are also walls extending from the tray. A first cable guide 20 is positioned on the outer edge of the tray 11. The guide 20 as guide portions 25 that extends higher from the tray 11 as the guide 20. A second cable guide 21 is positioned substantially parallel to the guide 20 on the tray 11.

On one side of the extractable fiber organizer tray 11 the cable guide 21 has a slit 22 that leads to an opening 23 providing passage for fibers from the first side of the tray 11 to the second side of the tray 11. On another side of the extractable fiber organizer tray 11 the cable guide 20 leads into a cable retaining portion 24 of the tray 11. The cable guides 20, 21 also provide anchoring means 26 for holding the cable in the vicinity of the tray 11. The anchoring means 26 are nearly as long as the distance between the two cable guides 20, 21. The cable guides 20, 21 also provide anchoring means 27 for holding the fibers going from the storing portion 13 to the opening 23 in the lower part of the guiding portion 14. The anchoring means 27 permit to guide buffered fibers, e.g. 900 µm buffered fibers, in a lower part of the guiding portion and to separate them from the jacketed cable entering the enclosure which is maintained in the upper part of the guiding portion between the anchoring means 27 and the anchoring means 26. Anchoring means 26 and 27 are arranged on two different levels as can be seen in FIG. 4B.

Figure 5A:
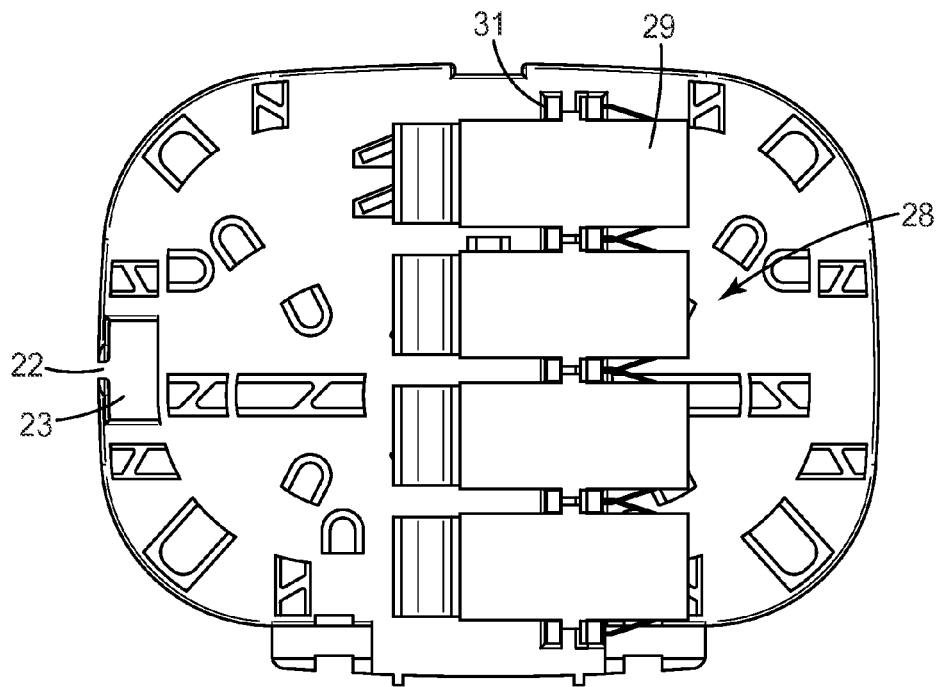
FIG. 5A is a top view of the second side of the extractable fiber organizer tray of FIG. 4.

FIG. 5A is a top view of the second side of the extractable fiber organizer tray 11 of FIG. 4. The second side of the tray 11 comprises a fiber connector mounting portion 28. In the fiber connector mounting portion four adapters 29 may be mounted. Therefore the fiber connection mounting portion provides clips 31 that may hold the adapters 29 on the tray 11. The adapters 29 are designed such that a standard connectorized end of a fiber optic fiber may be inserted from both sides thereby establishing a connection between the two fibers. In FIG. 5 can be seen the opening 23 with the slit 22 that provides passage for the fibers from the first side of the tray 11 to the second side of the tray 11.

Figure 5B:
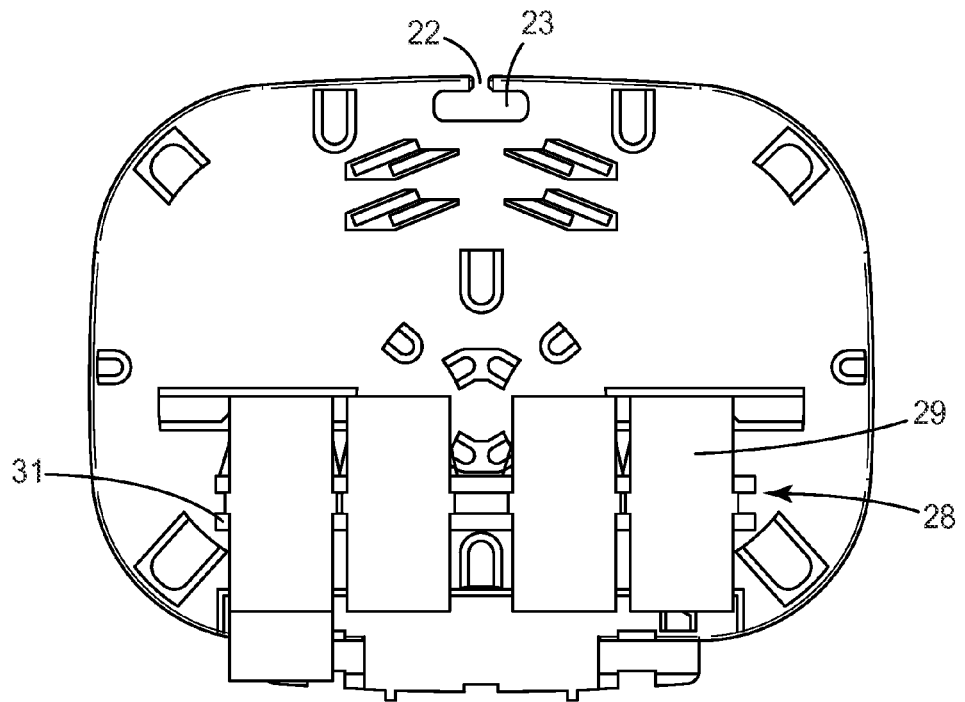
FIG. 5B is a top view of the second side of another embodiment of an extractable fiber organizer tray.

FIG. 5B is a top view of the second side of an extractable fiber organizer tray 11. The organizer tray 11 of FIG. 5B differs from that shown in FIG. 5A in that the adapters 29 of FIG. 5B are arranged in a position perpendicular to that of FIG. 5A. Another difference between those figures is that the opening 23 and the slit 22 are arranged on another side of the tray 11.

Figure 6:
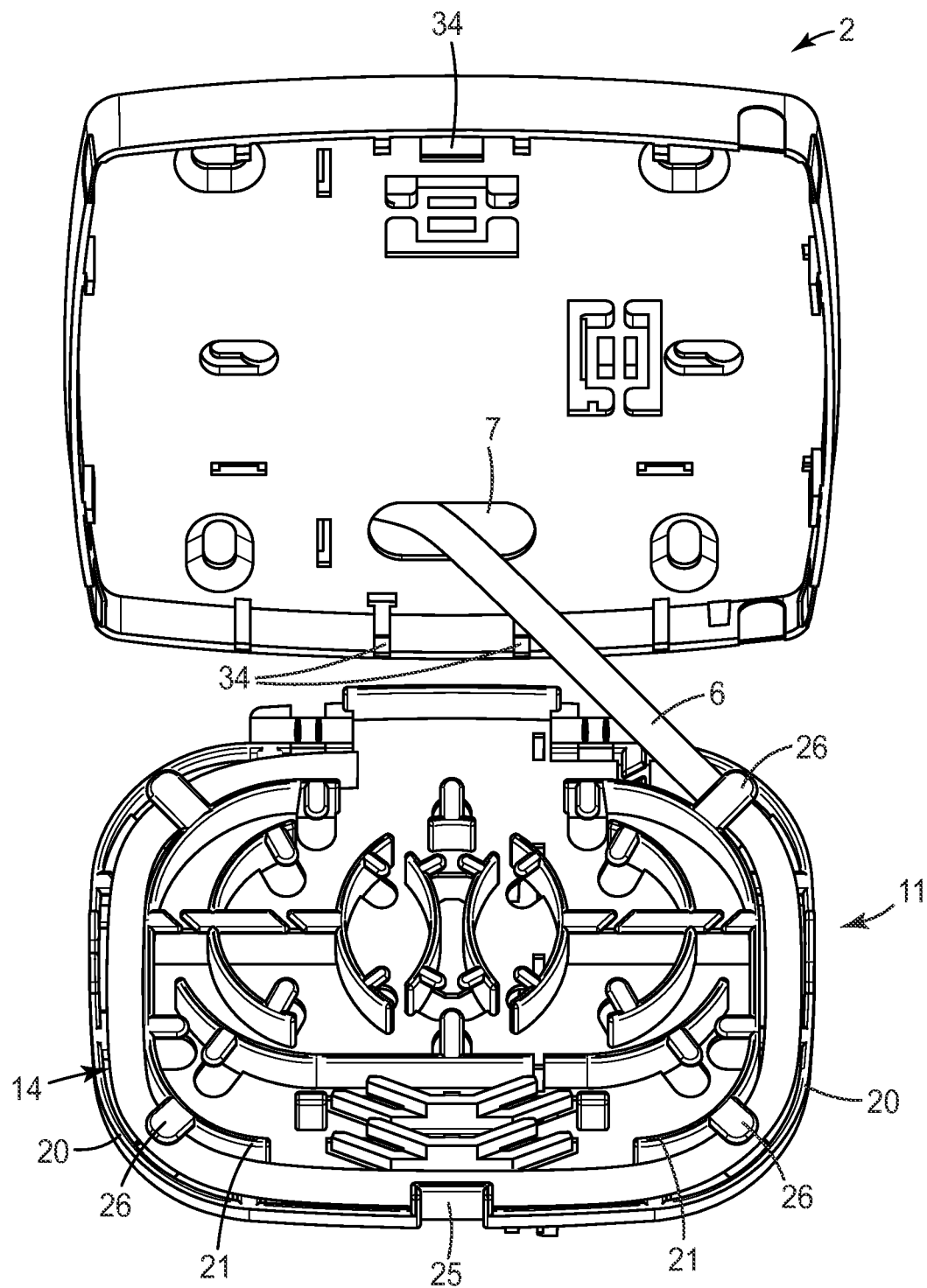
FIG. 6 is a three dimensional view of a base and a tray of an enclosure according to the invention and FIG. 7 is a top view of the terminal enclosure in a mounted state.

FIG. 6 is a perspective view of a base 2 with a tray 11 as well as an entering cable 6. The tray 11 is extracted from the base 2. The cable 6 passes the hole 7 of the base 2 and is than coiled in the upper part of the storing portion 14 for a cable. It is held in place by guides 20 and 21 as well as by anchoring means 26. Over fixing means 34 the tray 11 may be detached to the base 2 when it is put into the base 2. The fixing means have a snap fit configuration. They extend from the tray 11 and have a hook at their end with which they can hold the tray 11 in place. During insertion of the tray 11 into the base 2 the two parallel fixing means at the lower side wall of the base 2 may be used as a kind of hinge. In a first step the tray 11 may be placed such that it engages with these two fixing means. In a second step it may be pivoted around these fixing means 34. In a third step the tray 11 may be engaged with the third fixing mean 34 at the upper side wall of the base 2.

Figure 7:
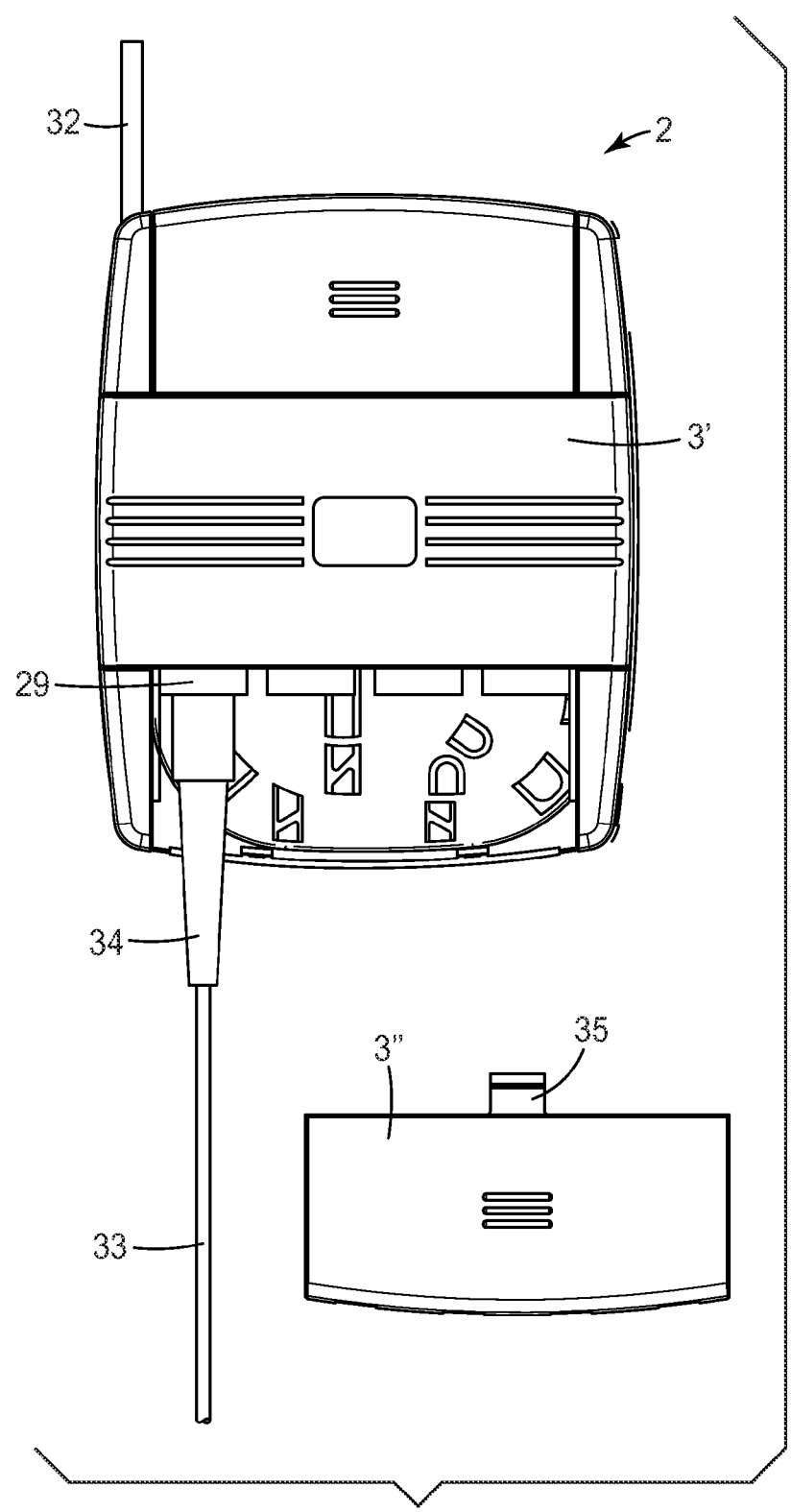

FIG. 7 is a top view of the terminal enclosure 1 of FIGS. 1 to 6 in a mounted state. The cover 3 has two parts 3' and 3". Part 3' of the cover is fixed to the base 2 (not shown in FIG. 7). FIG. 3" is detached from the terminal enclosure 1. Furthermore can be seen an entering cable 32 as well as a leaving patch cord 33. The leaving patch cord 33 ends at a connector 34 that is inserted into an adapter 29. The part 3" of the cover 3 has a latch 35 for anchoring and for fixing part 3" to part 3' of the cover 3. Before closing the cover completely, that is attaching part 3" to the enclosure, a breakout portion 5 (shown in FIG. 1A) of the cover 3 should be removed so that the patch cord 33 can leave the enclosure.

The invention claimed is:

1. A terminal enclosure for optical fibers for communications, comprising:
a housing including a base, a cover and
an extractable fiber organizer tray disposable in the housing having a first side and an opposite second side,
wherein the extractable fiber organizer tray comprises on its first side a splicing portion and portions for storing an entering jacketed cable as well as the fibers of a stripped portion of the cable and on its second side a fiber connector mounting portion, wherein the cover provides at least two parts, a first part that is fixed to the base after mounting the base and the organizer tray and a second, detachable part for providing access to the enclosure.

2. Terminal enclosure according to claim 1, wherein the extractable fiber organizer tray comprises an opening formed in the tray that permits passage of fibers from one side of the tray to the other side.

3. Terminal enclosure according to claim 1, wherein the extractable fiber organizer tray provides a cable guide that routes the jacketed cable entering the terminal enclosure.

4. Terminal enclosure according to claim 3, wherein the cable guide is positioned along the outer edge of the first side of the extractable fiber organizer tray.

5. Terminal enclosure according to claim 1, wherein the extractable fiber organizer tray provides several fiber guides for guiding fibers of the stripped portion of the cable.

6. Terminal enclosure according to claim 5, wherein the fiber guides are positioned inside of the cable guides.

7. Terminal enclosure according to claim 5, wherein the cable guides are used for guiding fibers as well as cables.

8. Terminal enclosure according to claim 1, wherein the extractable fiber organizer tray comprises a set of mounting arms for securing splices formed between optical fiber pigtails and the fibers.

9. Terminal enclosure according to claim 8, wherein the mounting arms for splices are arranged inside of the cable guides.

10. Terminal enclosure according to claim 1, wherein the base further comprises mounting means for mounting the enclosure on a rail.

11. Terminal enclosure according to claim 1, wherein the base comprises fixing means for fixing the extractable fiber organizer tray inside the enclosure.

12. Terminal enclosure according to claim 1, wherein the base further comprises breakout portions for the cable entering the enclosure.

13. Terminal enclosure according to claim 1, wherein the detachable part of the cover is arranged near or over the connector mounting portion of the extractable fiber organizer tray.

14. A terminal enclosure for optical fibers for communications, comprising:
a housing including a base, a cover and
an extractable fiber organizer tray disposable in the housing having a first side and an opposite second side,
wherein the extractable fiber organizer tray comprises on its first side a splicing portion and portions for storing an entering jacketed cable as well as the fibers of a stripped portion of the cable and on its second side a fiber connector mounting portion wherein the extractable fiber organizer tray comprises a set of mounting arms for securing splices formed between optical fiber pigtails and the fibers and wherein the mounting arms for splices are arranged inside of the cable guides.

15. Terminal enclosure according to claim 14, wherein the extractable fiber organizer tray comprises an opening formed in the tray that permits passage of fibers from one side of the tray to the other side.

16. Terminal enclosure according to claim 14, wherein the extractable fiber organizer tray provides a cable guide that routes the jacketed cable entering the terminal enclosure.

17. Terminal enclosure according to claim 14, wherein the extractable fiber organizer tray provides several fiber guides for guiding fibers of the stripped portion of the cable.

18. Terminal enclosure according to claim 14, wherein the base further comprises mounting means for mounting the enclosure on a rail.

19. Terminal enclosure according to claim 14, wherein the base comprises fixing means for fixing the extractable fiber organizer tray inside the enclosure.

20. Terminal enclosure according to claim 14, wherein the base further comprises breakout portions for the cable entering the enclosure.

* * * * *